United States Patent
Sung et al.

[11] Patent Number: 5,920,137
[45] Date of Patent: Jul. 6, 1999

[54] BRUSHLESS MOTOR FOR DRIVING WASHING MACHINE

[75] Inventors: Bu-hyun Sung, Suwon; Min-soo Lee, Uiwang, both of Rep. of Korea

[73] Assignee: Samsung Electronics Co., Ltd., Kyungki-do, Rep. of Korea

[21] Appl. No.: 08/969,673

[22] Filed: Nov. 13, 1997

[30] Foreign Application Priority Data

Nov. 13, 1996 [KR] Rep. of Korea ........................ 96-53814

[51] Int. Cl.⁶ .......................... H02K 5/16; H02K 21/12; F16C 17/04

[52] U.S. Cl. .......................... 310/90; 310/157; 384/226

[58] Field of Search .................... 310/67 R, 90, 310/157, 91; 384/226, 275, 420

[56] References Cited

U.S. PATENT DOCUMENTS

| | | | |
|---|---|---|---|
| 3,298,756 | 1/1967 | Wilson | 384/420 |
| 3,726,575 | 4/1973 | Moorman | 310/90 |
| 4,900,961 | 2/1990 | Kudo et al. | 310/90 |

*Primary Examiner*—Clayton LaBalle
*Attorney, Agent, or Firm*—Sughrue, Mion, Zinn, Macpeak & Seas, PLLC

[57] ABSTRACT

A brushless motor for driving a washing machine includes a stator fixed to a frame and having a shaft holder with a hollow portion and a yoke wound by a coil; a rotor having a shaft rotatably supported within the hollow portion of the shaft holder; and a flange having a passing hole connected to an upper portion of the shaft holder. The shaft protrudes from the upper portion of the shaft holder and includes a stepped portion having a diameter larger than that of the passing hole.

7 Claims, 2 Drawing Sheets

BRUSHLESS MOTOR FOR DRIVING WASHING MACHINE

BACKGROUND OF THE INVENTION

1. Field of the Invention

The present invention relates to a brushless motor, and more particularly, to a brushless motor for driving a washing machine for reducing oscillations and noise.

2. Description of Related Art

In general, a brushless motor rotates a rotor by alternating the direction of current flowing in a driving coil without a brush.

Referring to FIG. 1, a conventional brushless motor includes a stator and a rotor rotatably connected to the stator.

The stator includes a shaft holder 20 and a yoke 30 installed under the shaft holder 20. The shaft holder 20 is fixed to a frame 10, and has a hollow portion 20a in which a shaft 50 is inserted. A groove 50a is formed on the upper portion of the shaft 50. First and second bearings 15 and 16 are installed in the shaft holder 20, and a receiving groove 20b is formed on the upper portion of the shaft holder 20. A washer 55 which fits in the groove 50a of the shaft 50 is installed in the receiving groove 20b to rest on the first bearing 15. Accordingly, the shaft 50 can be rotatably supported by means of the first and second bearings 15 and 16 without deviating downwards along the shaft axis. The yoke 30 connected to the shaft holder 20 is wound with a coil (not shown) so that a magnetic field is generated when current is applied to the coil.

The rotor includes the shaft 50 which is rotatably supported by the shaft holder 20, and a housing 60 which is connected to the bottom of the shaft 50, through a connecting portion 65, and which surrounds the yoke 30. A magnet 70 is disposed on the inner circumferential surface of the housing 60, spaced apart from the yoke 30 so that it can magnetically cooperate with the yoke 30.

In the above-described brushless motor, when an alternating current is applied to the coil surrounding the yoke 30, a magnetic field is generated which cooperates with the magnet to rotate the rotor with respect to the stator.

However, when the rotor operates for a long time, the shape of the washer 55 supporting the shaft 50 deforms causing the rotor to rotate off center and oscillate or generate noise.

Furthermore, if the rotor is heavy, the washer 55 can break, thereby permitting the rotor to deviate from its proper position in the stator.

SUMMARY OF THE INVENTION

It is an object of the present invention to provide a brushless motor for driving a washing machine capable of preventing rotor oscillation and noise, and also capable of supporting a heavy rotor.

To accomplish the above object, there is provided a brushless motor for driving a washing machine including a stator having a shaft holder with a hollow portion fixed to a frame, and a yoke wound with a coil fixed to the stator; a rotor having a shaft rotatably supported within the hollow portion of the shaft holder; a flange having a passing hole through which the shaft passes and connected to an upper portion of the shaft holder; and a stepped portion formed at the upper portion of the shaft and having a diameter larger than that of the flange passing hole.

BRIEF DESCRIPTION OF THE DRAWINGS

The above object and advantages of the present invention will become more apparent by describing in detail a preferred embodiment thereof with reference to the attached drawings in which.

DETAIL DESCRIPTION OF THE INVENTION

Figure 1:
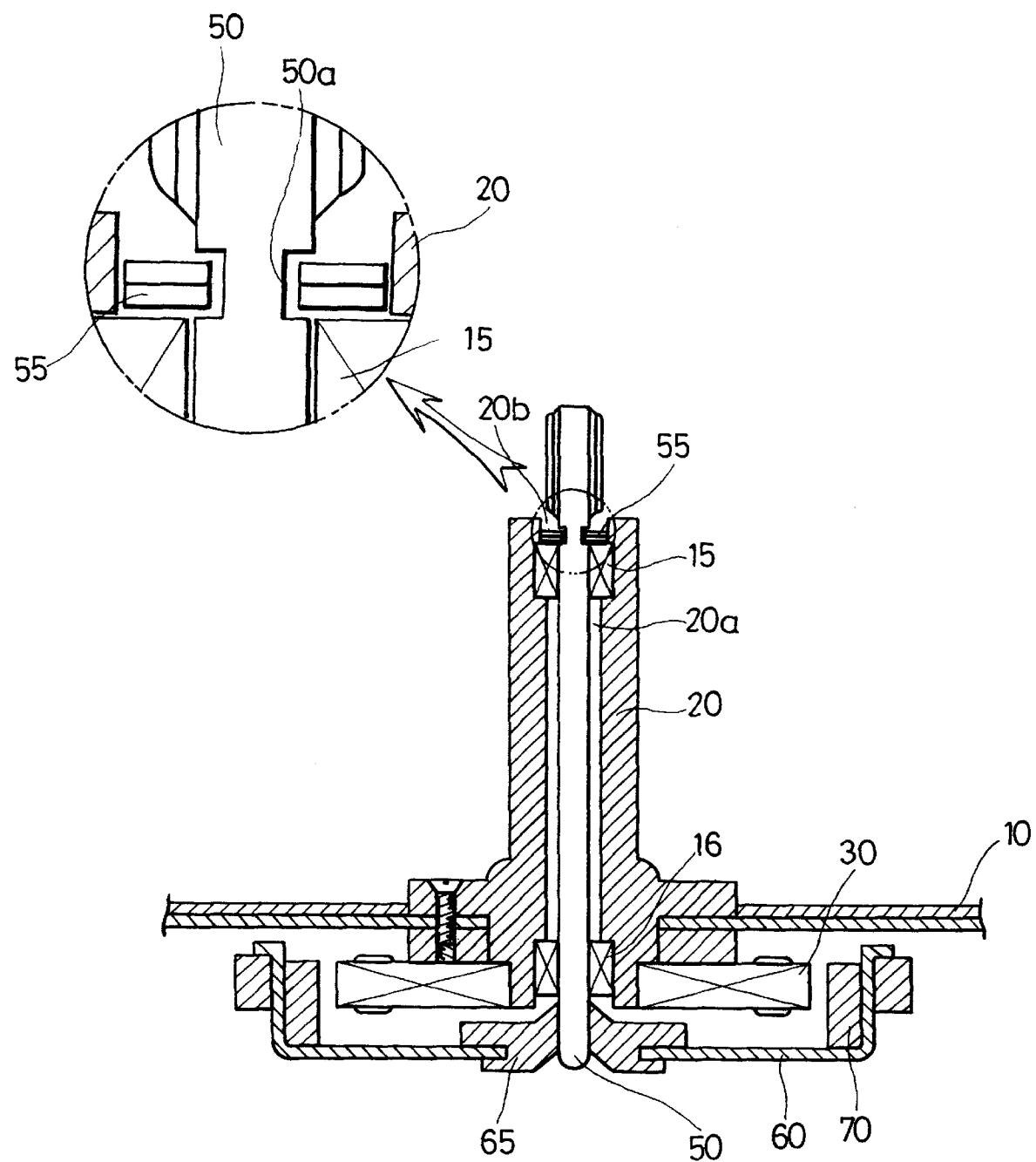
FIG. 1 is a sectional view of a conventional brushless motor for driving a washing machine.
Figure 2:
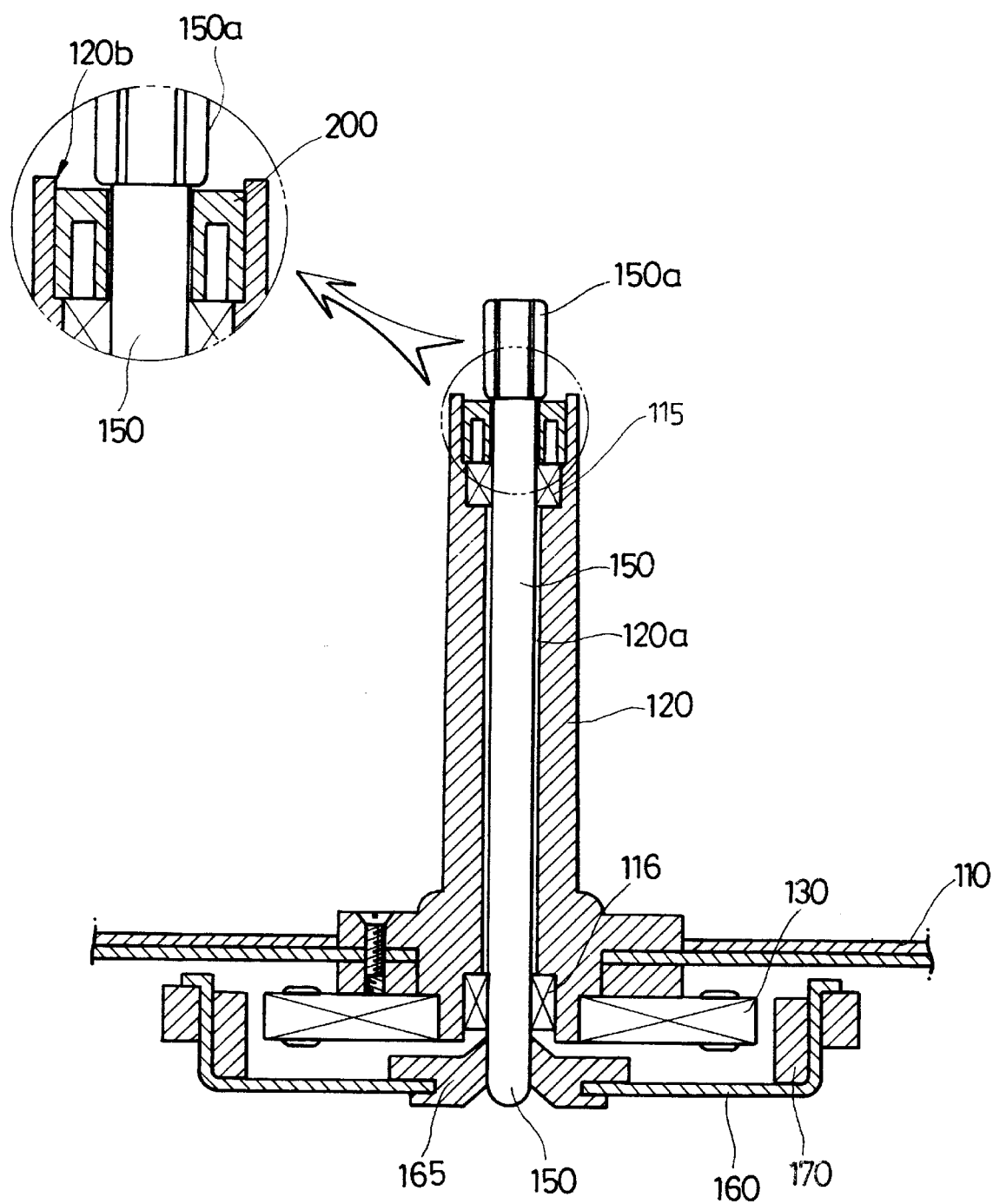
FIG. 2 is a sectional view of a brushless motor for driving a washing machine according to the present invention.

Referring to FIG. 2, a brushless motor for driving a washing machine according to the present invention includes a stator and a rotor rotatably connected to the stator.

The stator includes a shaft holder 120 and a yoke 130 installed under the shaft holder 120. The shaft holder 120 is fixed to the frame 110 and has a hollow portion 120a in which a shaft 150 is inserted. The shaft 150 is rotatably supported in the shaft holder 120 by means of first and second bearings 115 and 116, respectively. A flange receiving portion 120b is formed on the shaft holder 120, and a flange 200 having a passing hole through which the shaft 150 passes is located in the flange receiving portion 120b. The shaft 150 passing through the flange 200 is prevented from deviating from the shaft holder 120 due to a stepped portion 150a formed at an upper portion of the shaft 150. The stepped portion 150a has a diameter larger than that of the passing hole of the flange 200, and is connected to an agitation piece (not shown) or a spin-drying tank of a washing machine (not shown). The yoke 130 connected to the shaft holder 120 is wound with a coil (not shown) so that a magnetic field is generated when current is applied to the coil.

The rotor includes a shaft 150 rotatably supported in the shaft holder 120, and a housing 160 which is connected to the bottom of the shaft 150, through a connecting portion 165, and which surrounds the yoke 130. A magnet 70 is disposed on the inner circumferential surface of the housing 60, spaced apart from the yoke 30 so that it can magnetically cooperate with the yoke 30.

According to the brushless motor for driving a washing machine of the present invention, when an alternating current (AC) is applied to the coil winding the yoke 130, a magnetic field is generated. The magnetic field cooperates with the magnet 170 to rotate the rotor with respect to the stator.

Since the shaft 150 is supported by the flange 200 installed on the shaft holder 120, downward movement of the rotor along the shaft axis is prevented even when the rotor is heavy. Also, because the rotor is supported to the stator by the flange, oscillations or noise caused by damage to the washer of the conventional brushless motor are eliminated.

What is claimed is:

1. A brushless motor for driving a washing machine comprising:

a stator including a shaft holder fixed to a frame and a yoke wound with a coil, said shaft holder having a hollow portion;

a rotor having a shaft rotatably supported within said hollow portion of said shaft holder;

a support bearing for rotatably supporting the shaft within said hollow portion;

a flange having a passing hole through which said shaft passes, said flange connected to an upper portion of said shaft holder; and a stepped portion formed at an upper part of said shaft, and having a diameter larger than that of the passing hole of said flange; and wherein said shaft has a uniform diameter along a length of said shaft confronting said support bearing and said flange.

2. A brushless motor for driving a washing machine according to claim 1, wherein said flange contacts said stepped portion and supports said shaft in an axial direction of said shaft.

3. A brushless motor for driving a washing machine according to claim 1, wherein said flange limits a movement of said shaft in only one axial direction of said shaft.

4. A brushless motor for driving a washing machine according to claim 1, wherein said flange is a single integral unit.

5. A brushless motor for driving a washing machine comprising:

- a stator including a shaft holder fixed to a frame and a yoke wound with a coil, said shaft holder having a hollow portion;
- a rotor having a shaft rotatably supported within said hollow portion of said shaft holder;
- a support bearing for rotatably supporting said shaft within said hollow portion and having a first passing hole through which said shaft passes;
- a flange having a second passing hole through which said shaft passes, said flange connected to an upper portion of said shaft holder; and
- a stepped portion formed at an upper part of said shaft, said step portion having a cross-section taken along a plane perpendicular to the shaft axis which is larger than respective cross-sections of the first passing hole of said bearing and the second passing hole of said flange taken along respective planes perpendicular to the shaft axis.

6. A brushless motor for driving a washing machine comprising:

- a stator including a shaft holder fixed to a frame and a yoke wound with a coil, said shaft holder having a hollow portion;
- a rotor having a shaft rotatably supported within said hollow portion of said shaft holder;
- a flange having a passing hole through which said shaft passes, said flange connected to an upper portion of said shaft holder; and
- a stepped portion formed at an upper part of said shaft, said step portion having a cross-section taken along a plane perpendicular to the shaft axis which is larger than a cross-section of the passing hole of said flange taken along a plane perpendicular to the shaft axis; and
- wherein said flange limits a movement of said shaft in only one axial direction of said shaft.

7. A brushless motor for driving a washing machine according to claim 6, wherein said flange is a single integral unit.

* * * * *